(12) United States Patent
Park et al.

(10) Patent No.: US 12,522,219 B2
(45) Date of Patent: Jan. 13, 2026

(54) SYSTEM FOR GENERATING ANSWERS BASED ON MULTI-TASK LEARNING AND CONTROL METHOD THEREOF

(71) Applicants: Hyundai Motor Company, Seoul (KR); Kia Corporation, Seoul (KR)

(72) Inventors: Cheoneum Park, Seongnam-Si (KR); Juae Kim, Seoul (KR)

(*) Notice: Subject to any disclaimer, the term of this patent is extended or adjusted under 35 U.S.C. 154(b) by 294 days.

(21) Appl. No.: 18/195,770

(22) Filed: May 10, 2023

(65) Prior Publication Data

US 2023/0365138 A1 Nov. 16, 2023

(30) Foreign Application Priority Data

May 11, 2022 (KR) .......................... 10-2022-0057970

(51) Int. Cl.
  *G10L 15/22* (2006.01)
  *B60W 40/08* (2012.01)
(52) U.S. Cl.
  CPC .............. *B60W 40/08* (2013.01); *G10L 15/22* (2013.01); *B60W 2540/21* (2020.02); *G10L 2015/223* (2013.01)
(58) Field of Classification Search
  CPC ... B60W 40/08; B60W 2540/21; G10L 15/22; G10L 2015/223; G10L 15/1822; G06N 3/0442; G06N 3/0455; G06N 3/047; G06N 3/045; G06N 3/096; G06N 3/08; G06N 5/04; G06F 16/3329; G06F 16/35; G06F 40/30
  See application file for complete search history.

(56) References Cited

U.S. PATENT DOCUMENTS

| 11,455,338 | B2 | 9/2022 | Nakano |
| 11,797,611 | B2 * | 10/2023 | Yu .......................... G06N 3/096 |
| 2020/0042597 | A1 * | 2/2020 | Wu ......................... H04L 51/02 |
| 2020/0342876 | A1 | 10/2020 | Woike |

(Continued)

FOREIGN PATENT DOCUMENTS

| CN | 107679039 A | * | 2/2018 | ........... G06F 40/284 |
| CN | 111209383 A | | 5/2020 | |

(Continued)

OTHER PUBLICATIONS

Jang "A Beginner's Guide to Variational Methods: Mean-Field Approximation", A Beginner's Guide to Variational Methods: Mean-Field Approximation, Sunday, Aug. 7, 2016, pp. 1-7.

(Continued)

*Primary Examiner* — Abul K Azad
(74) *Attorney, Agent, or Firm* — Banner & Witcoff, Ltd.

(57) ABSTRACT

Disclosed herein is a system including an answer determination module configured to analyze an input sentence to determine whether to answer the input sentence, a learning module configured to output a domain corresponding to the input sentence and a plurality of categories to which the input sentence belongs when it is determined to answer the input sentence, and an output module configured to output an answer to the input sentence, wherein the learning module performs multi-task learning using the input sentence as input data and using as output data the domain corresponding to the input sentence and the plurality of categories to which the input sentence belongs.

21 Claims, 16 Drawing Sheets

(56) References Cited

U.S. PATENT DOCUMENTS

| | | | |
|---|---|---|---|
| 2021/0023945 A1 | 1/2021 | Xie et al. | |
| 2021/0233528 A1 | 7/2021 | Maeda et al. | |
| 2023/0135579 A1* | 5/2023 | Wang | G06F 40/30 704/9 |
| 2023/0205994 A1* | 6/2023 | Wei | G06F 40/30 704/9 |

FOREIGN PATENT DOCUMENTS

| | | | | |
|---|---|---|---|---|
| CN | 111581361 A | * | 8/2020 | G06F 16/3329 |
| CN | 111651572 A | | 9/2020 | |
| EP | 3226239 A1 | | 10/2017 | |
| JP | 2020-086203 A | | 6/2020 | |
| KR | 10-2021-0073883 A | | 6/2021 | |

OTHER PUBLICATIONS

Free Energies and Variational Inference, Thoughts on Data Science, Machine Learning, and AI, <https://calculatedcontent.com/2017/09/06/free-energies-and-variational-inference/>, Sep. 6, 2017, Dec. 4, 2018, pp. 1-15.

Kingman et al. "Auto-encoding Variational Bayes", Dec. 10, 2022, pp. 1-14.

* cited by examiner

FIG. 2

| REPRESENTATIVE QUESTION | ANSWER |
|---|---|
| WHAT IS AUTO-HOLD? | AUTO-HOLD IS FUNCTION OF MAINTAINING STOP STATE EVEN WHEN YOU TAKE YOUR FOOT OFF BRAKE AFTER VEHICLE IS STOPPED |
| HOW DO I RELEASE SAFETY BELT? | PRESS BUCKLE ON RIGHT OR LEFT OF SEAT |
| HOW DO I TURN ON HEAT WIRE OF STEERING WHEEL? | PRESS STEERING WHEEL HEAT WIRE BUTTON NEXT TO START BUTTON |

FIG. 6

| INPUT SENTENCE | ANJEONBELTEUGA PPAJIJI ANHNEUNDE EOTTEOHGE HAEYA HAJI? |
|---|---|
| NORMALIZED INPUT SENTENCE | ANJEONBELTEUGA PPAJIJI ANHNEUNDE EOTTEOHGE HAEYA HAJI |
| MORPHEME ANALYSIS RESULT | ANJEON, BELTEU, GA, PPAJI, JI, ANH, NEUNDE, EOTTEOHGE, HA, AYA, HA, JI |
| PART-OF-SPEECH ANALYSIS RESULT | NNG, NNG, JKS, VV, EC, VX, EC, MAG, VV, EC,VX, EF |
| SYLLABLE ANALYSIS RESULT | AN, JEON, BEL, TEU, GA, PPA, JI, JI, ANH, NEUN, DE, EO, TTEOH, GE, HAE, YA, HA, JI |

FIG. 7

| TEXT OF INPUT SENTENCE | ANJEON/NNG, BELTEU/NNG, GA/JKS, PPAJI/VV, JI/EC, ANH/VX, NEUNDE/EC, EOTTEOHGE/MAG, HA/VV, AYA/EC HA/VX, JI/EF |
|---|---|
| INDEXES OF INPUT SENTENCE | 480, 5614, 26, 852, 63, 73, 179, 1, 50, 141, 68, 3440 |
| SYLLABLE-UNIT ANALYSIS RESULT | [AN, JEON], [BEL, TEU], [GA], [PPA, JI], [JI], [ANH], [NEUN, DE], [EO, TTEOH, GE], [HAE], [A, YA], [HA], [JI] |
| INDEXES OF SYLLABLE UNITS | [ [56, 6], [195, 113], [38], [271, 11], [11], [299], [24, 74], [17, 106, 75], [23], [10, 52], [23], [11] ] |

SYSTEM FOR GENERATING ANSWERS BASED ON MULTI-TASK LEARNING AND CONTROL METHOD THEREOF

CROSS-REFERENCE TO RELATED APPLICATION

This application claims the benefit of Korean Patent Application No. 10-2022-0057970, filed on May 11, 2022, in the Korean Intellectual Property Office, the disclosure of which is incorporated herein by reference.

BACKGROUND

1. Field

The present disclosure relates to a system for providing an answer to a question uttered by a user and a control method thereof.

2. Discussion of the Background

A dialogue system may be a system for analyzing and predicting a user's intention through a conversation with a user and providing a service corresponding to the user's intention, and may be connected with a certain device to control the device according to the user's intention and provide certain information according to the user's intention.

Because a user's movement is limited (e.g., spatially and situationally) in a vehicle, a dialogue system for finding out a user's intention from the user's utterance and providing a desired service to the user may be useful.

In particular, because there is a need for a service of providing an answer to a user's question related to a vehicle, research and development for improving the accuracy and quality of such services are needed.

SUMMARY

The following summary presents a simplified summary of certain features. The summary is not an extensive overview and is not intended to identify key or critical elements.

It is an aspect of the present disclosure to provide a question and answer system for providing an appropriate answer to a question related to a vehicle by applying deep learning, and a control method thereof.

Additional aspects of the present disclosure will be set forth in part in the description which follows and, in part, will be obvious from the description, or may be learned by practice of the present disclosure.

A system may comprise: one or more processors; and memory storing instructions that, when executed by the one or more processors, cause the system to: analyze an input sentence to determine whether to provide an answer associated with the input sentence; using a multi-task learning process and based on a determination to provide an answer associated with the input sentence, determine a domain corresponding to the input sentence and determine a plurality of categories to which the input sentence belongs, wherein the multi-task learning process is configured to use the input sentence as input data and to use, as output data, the domain and the plurality of categories; and output, based on the domain and the plurality of categories, a determined answer associated with the input sentence.

The instructions, when executed by the one or more processors, may cause the system to: encode, using an in-domain encoding module, text converted from the input sentence to generate an output of the in-domain encoding module; and determine, using an in-domain determination module and based on the output of the in-domain encoding module, whether to provide an answer associated with the input sentence.

The instructions, when executed by the one or more processors, may cause the system to apply, based on a variational inference network, a variational inference to the output of the in-domain encoding module, wherein an output of the variational inference network is input to the in-domain determination module.

The instructions, when executed by the one or more processors, may cause the system to classify, by a learning module and during the multi-task learning process, the domain, a first category of the plurality of categories, and a second category of the plurality of categories.

The instructions, when executed by the one or more processors, may cause the system to: calculate a first loss value of a classification of the domain and second loss values of classifications of the plurality of categories; and adjust, based on the first loss value and the second loss values, a weight of a deep learning model used for the multi-task learning process.

The instructions, when executed by the one or more processors, may cause the system to: encode, using an encoding module, an input sequence corresponding to the input data to generate an output of the encoding module; classify, using a domain classifier and based on the output of the encoding module, the domain; classify, using a first category classifier and based on the output of the encoding module, a first category of the plurality of categories; and classify, using a second category classifier and based on the output of the encoding module, a second category of the plurality of categories.

The encoding module may comprise: a first encoding layer configured to encode a received input associated with the input sequence; a second encoding layer configured to encode an output of the first encoding layer; and a third encoding layer configured to encode an output of the second encoding layer.

The instructions, when executed by the one or more processors, may cause the system to classify, using the domain classifier and based on the output of the first encoding layer, the domain.

The instructions, when executed by the one or more processors, may cause the system to apply, using a variational inference network, a variational inference to the output of the second encoding layer, wherein an output of the variational inference network is input to the first category classifier.

The instructions, when executed by the one or more processors, may cause the system to classify, using the second category classifier and based on an output of the third encoding layer, the second category.

The domain may comprise a domain associated with a vehicle, and the plurality of categories may comprise categories associated with a vehicle.

A control method may comprise: analyzing, by a computing device, an input sentence to determine whether to provide an answer associated with the input sentence; based on a determination to provide an answer associated with the input sentence, performing a multi-task learning process to determine a domain corresponding to the input sentence and to determine a plurality of categories to which the input sentence belongs, wherein the performing of the multi-task learning process comprises using the input sentence as input data and using, as output data, the domain and the plurality of categories; determining, based on the multi-task learning process, the domain and the plurality of categories; and outputting, based on the domain and the plurality of categories, a determined answer associated with the input sentence.

The control method may comprise encoding text converted from the input sentence; and determining, based on a result of encoding the text, whether to provide an answer associated with the input sentence.

The determining of whether to provide an answer associated with the input sentence may comprise: applying a variational inference to the result of encoding the text; and determining, based on a result of applying the variational inference, whether to provide an answer associated with the input sentence.

The performing of the multi-task learning process may comprise classifying the domain, a first category of the plurality of categories, and a second category of the plurality of categories.

The performing of the multi-task learning process may further comprise: calculating a first loss value of a classification of the domain and second loss values of classifications of the plurality of categories; and adjusting, based on the first loss value and the second loss values, a weight of a deep learning model used for the multi-task learning process.

The performing of the multi-task learning process may further comprise: encoding an input sequence corresponding to the input data; classifying, based on a result of encoding the input sequence, the domain; classifying, based on the result of encoding the input sequence, a first category of the plurality of categories; and classifying, based on the result of encoding the input sequence, a second category of the plurality of categories.

The encoding of the input sequence may comprise: performing, based on the input sequence, a first encoding; performing, based on a result of the first encoding, a second encoding; and performing, based on a result of the second encoding, a third encoding.

The classifying of the domain may comprise: classifying, based on the result of the first encoding, the domain.

The classifying of the first category may comprise: applying a variational inference to the result of the second encoding; and classifying, based on a result of applying the variational inference, the first category.

The classifying of the second category may comprise: classifying, based on the result of the third encoding, the second category.

These and other features and advantages are described in greater detail below.

BRIEF DESCRIPTION OF THE DRAWINGS

These and/or other aspects of the present disclosure will become apparent and more readily appreciated from the following description of various examples, taken in conjunction with the accompanying drawings of which:

FIG. 2 is a diagram illustrating an example of information stored in a memory of a question and answer system;

FIG. 6 is a table showing examples of features extracted by a question and answer system;

FIG. 7 is a table showing an example of a result of converting a format by a question and answer system;

DETAILED DESCRIPTION

Figure 1:
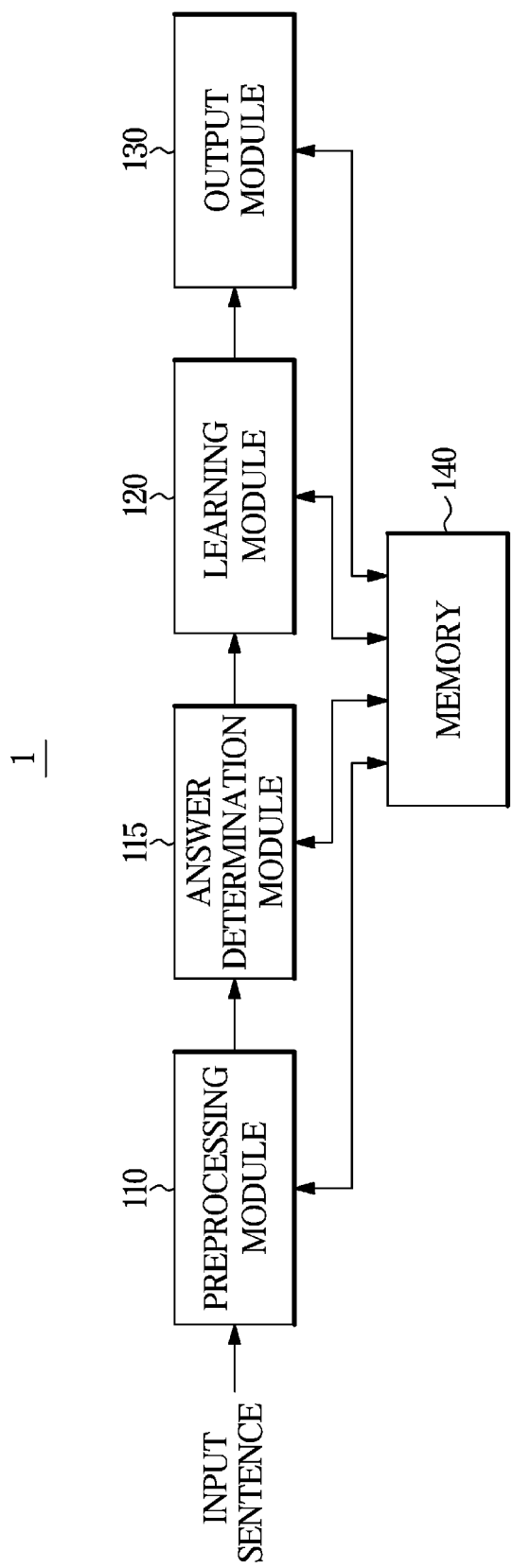
FIG. 1 is a control block diagram of a question and answer system.

The same reference numerals refer to the same or similar elements throughout the specification. The present specification does not describe all elements of various features of the present disclosure, and description of general matters in the technical field to which the present disclosure pertain or the same matters in the illustrated examples will be omitted herein. Terms such as "unit," "module," "member," and "block" used herein may be embodied as software and/or hardware components, and a plurality of units, modules, members, or blocks may be embodied together as one component or one unit, module, member or block may include a plurality of components.

Various features described herein and configurations shown in the drawings are examples of the present disclosure, and there may be a variety of modified examples that replace one or more features and drawings of the present disclosure at the time of filing the present disclosure.

The terms used herein are only used to describe various examples and are not intended to limit the present disclosure. As used herein, the singular expressions are intended to include plural forms as well, unless the context clearly dictates otherwise. It should be understood that terms such as "include," "comprise" or "have," when used herein, specify the presence of stated features, integers, steps, operations, elements, components, or a combination thereof, but do not preclude the presence or addition of one or more features, integers, steps, operations, elements, components, or a combination thereof.

Terms such as "unit,", "device", "block," "member," and "module" should be understood to mean a unit in which at least one function or operation is processed. For example, the terms may be understood to mean at least one type of hardware such as a field-programmable gate array (FPGA)/application-specific integrated circuit (ASIC), at least one type of software stored in a memory, or at least one process to be processed by a processor.

Ordinal numbers such as "first" and "second" added in front of components described herein are merely used to distinguish one component from another and are not intended to indicate, for example, an order of connection, an order of usage, an order of priority, etc., between components.

Reference numerals assigned to operations are used to distinguish between the operations and are not intended to describe an order of the operations and thus the operations may be performed in an order different from that described herein unless the context indicates a specific order.

Various features set forth herein may be implemented as a recording medium storing computer-executable instructions. The instructions may be stored in the form of program code, and a program module may be produced to perform operations of the embodiments when the instructions are executed by a processor. The recording medium may be implemented as a computer-readable recording medium.

Examples of the computer-readable recording medium include various types of recording media storing instructions interpretable by a computer. Examples of the computer-readable recording medium may include a read-only memory (ROM), a random access memory (RAM), a magnetic tape, a magnetic disk, a flash memory, an optical data storage device, etc.

Hereinafter, a question and answer system and a control method thereof will be described in detail with reference to the accompanying drawings.

FIG. 1 is a control block diagram of a question and answer system. FIG. 2 is a diagram illustrating an example of information stored in a memory of a question and answer system.

Referring to FIG. 1, a question and answer system 1 may include a memory 140 storing a plurality of questions and a plurality of answers corresponding thereto to be matched with each other and/or storing sentences each including a correct answer, an answer determination module 115 configured to analyze an input sentence to determine whether to answer the input sentence, a learning module 120 configured to output a domain corresponding to the input sentence and a plurality of categories to which the input sentence belongs using the input sentence as input data when it is determined to answer the input sentence, and an output module 130 configured to retrieve an answer matching the input sentence from the memory 140 and output the retrieved answer. The one or more modules described with respect to FIG. 1 may be implemented in one or more processors that execute corresponding instructions to perform the features of the one of more modules.

Here, the domain and the plurality of categories may include a domain and a category related to a vehicle.

The question and answer system 1 may be a system that provides an answer to a question uttered by a user. Here, the question uttered by the user may be predetermined frequently asked question(s) (FAQ), and the question and answer system 1 may output one or more answers to the predetermined FAQ.

Alternatively or additionally, the question and answer system 1 may be a machine reading comprehension (MRC) system that finds an answer corresponding to a user's question from a paragraph containing a correct answer in a state in which the paragraph is provided.

When the question and answer system 1 is connected with or coupled to a vehicle, the question uttered by the user may be a question related to the vehicle. Accordingly, the question and answer system 1 may output an answer to a vehicle-related FAQ uttered by the user or may search for the paragraph including the correct answer (or an appropriate answer) and output an answer.

To this end, as illustrated in FIG. 2, in the memory 140, a representative question for each of a plurality of FAQs related to the vehicle and an answer thereto may be matched with each other and stored as a pair of a question and answer.

Meanwhile, a user may utter the same question (or similar questions in the same context) in various sentences. That is, the user may utter a sentence that is different from a representative question stored in the memory 140 but has the same meaning as the representative question.

In performing learning described above, the question and answer system 1 may perform a multi-task learning process for simultaneously learning a domain corresponding to an input sentence and a category to which the input sentence belongs. In this way, the performance of the learning module 120 may be improved by simultaneously learning tasks that are related to each other.

To this end, the question and answer system 1 may perform learning using an input sentence as input data and using, as output data, a domain corresponding to the input sentence and a plurality of categories to which the input sentence belongs.

The multi-task learning may be performed based on a deep learning model (and/or other machine learning models), and examples features of multi-task learning of the learning module 120 will be described in detail below.

The output module 130 may retrieve an answer corresponding to the input sentence from the memory 140 and output the retrieved answer.

Because the answer determination module 115 may determine in advance whether the question and answer system 1 is capable of answering the input sentence and the learning module 120 may classify the domain corresponding to the input sentence and the plurality of categories, the output module 130 may retrieve an answer within a range of the corresponding domain and the plurality of categories, thereby improving answering performance.

An input sentence uttered by a user may be converted into an appropriate format to be processed by the deep learning model before the input sentence is input to the learning module 120. To this end, the question and answer system 1 may include a preprocessing module 110 for converting a format of an input sentence.

A process of preprocessing a user's utterance will be described below.

Figure 3:
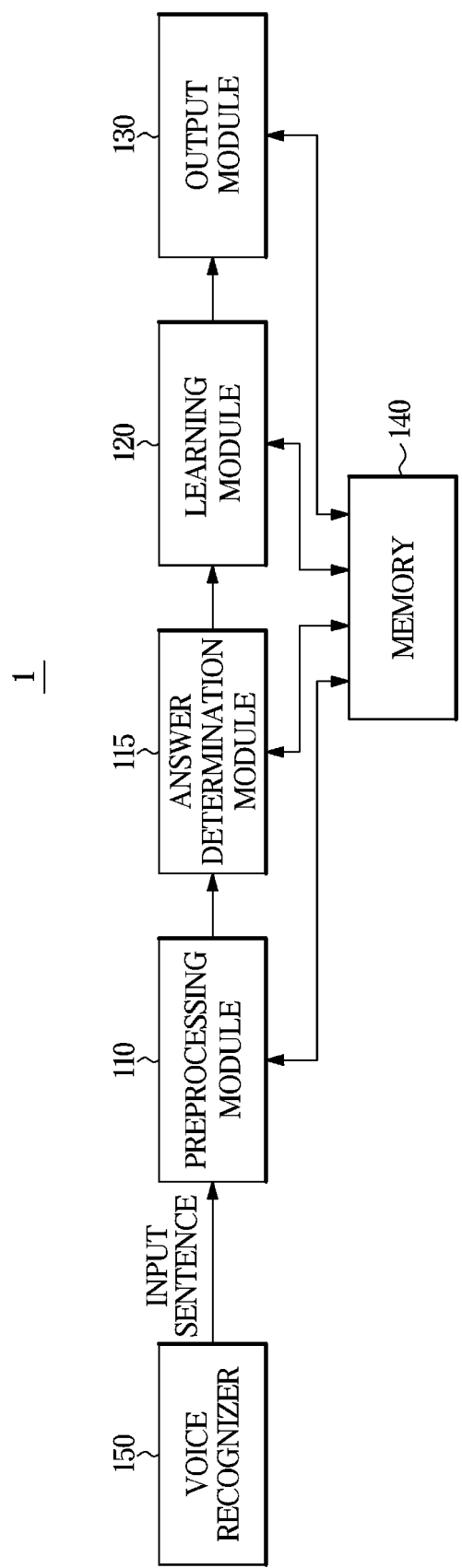
FIG. 3 is a control block diagram of a question and answer system.
Figure 4:
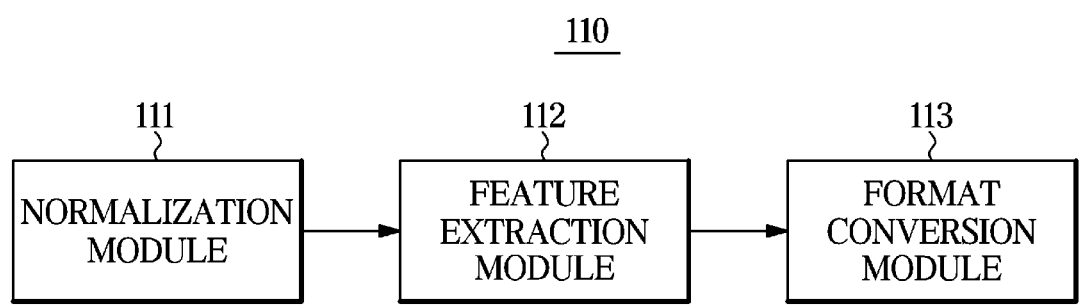
FIG. 4 is a control block diagram illustrating a configuration of a preprocessing module of a question and answer system.

FIG. 3 is a control block diagram of a question and answer system, and FIG. 4 is a control block diagram of a configuration of a preprocessing module of a question and answer system.

Referring to FIG. 3, a question and answer system 1 may further include a voice recognizer 150 configured to convert a user's utterance (e.g., a user's utterance detected as an audio signal) into text (e.g., a sentence).

The voice recognizer 150 may be implemented as a speech-to-text (STT) engine and may convert a user's utterance into text by applying a speech recognition algorithm.

For example, the voice recognizer 150 may extract a feature vector from the user's utterance using a feature vector extraction technique such as cepstrum, linear predictive coding (LPC), mel frequency cepstral coefficient (MFCC), filter bank energy or the like.

The extracted feature vector may be compared with a trained reference pattern to obtain a recognition result. To this end, an acoustic model that models signal features of voice and compares them with each other or a language model that models the relationship in a linguistic order of words or syllables corresponding to a recognized vocabulary may be used.

The voice recognizer 150 may convert the user's utterance into text based on a learning process to which machine learning and/or deep learning is applied. However, a method of converting a user's utterance into text by the voice recognizer 150 is not limited to a particular technique, and thus the voice recognizer 150 may convert the user's utterance into text by applying various voice recognition techniques, as well as the above-described method. Hereinafter, the text output from the voice recognizer 150 may be referred to as an input sentence.

The input sentence corresponding to the user's utterance may be input to the preprocessing module 110 to be converted into a form processable by a learning model (e.g., the deep learning model).

Referring to FIG. 4, the preprocessing module 110 may include a normalization module 111 configured to normalize an input sentence, a feature extraction module 112 configured to extract a feature from the input sentence, and a format conversion module 113 configured to convert a format of the input sentence.

The normalization module 111 may perform normalization to exclude meaningless data such as special characters, symbols, and the like in an input sentence. It is assumed herein that all input sentences processed by components described below are normalized input sentences.

The feature extraction module 112 may extract a feature from the normalized input sentence, and the format conversion module 113 may assign an index to the input sentence based on the extracted feature.

Figure 5:
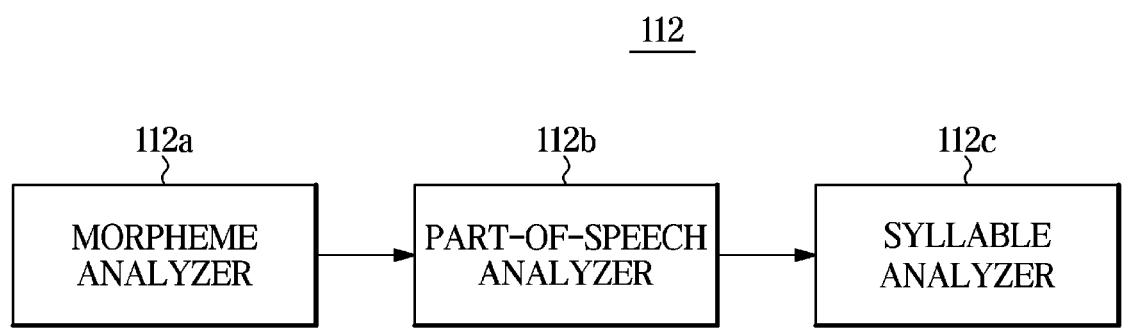
FIG. 5 is a control block diagram illustrating a configuration of a feature extraction module of a question and answer system.

FIG. 5 is a control block diagram illustrating a configuration of a feature extraction module of a question and answer system.

Referring to FIG. 5, a feature extraction module 112 may include a morpheme analyzer 112a, a part-of-speech analyzer 112b, and a syllable analyzer 112c.

The morpheme analyzer 112a may divide an input sentence into morphemes, and the part-of-speech analyzer 112b may analyze parts of speech of the morphemes and tag the parts of speech on the morphemes.

The syllable analyzer 112c may divide the input sentence into syllables. Unknown or infrequent words may be analyzed using not only morphemes but also syllables as features, thereby improving the performance of the learning module 120.

FIG. 6 is a table showing examples of features extracted by a question and answer system, and FIG. 7 is a table showing an example of a result of converting a format by a question and answer system.

A result of extracting features from an input sentence "ANJEONBELTEUGA PPAJIJI ANHNEUNDE EOTTEOHGE HAEYA HAJI?" (meaning that 'the seatbelt won't come off, what should I do?) will be described as an example here.

Referring to FIG. 6, the normalization module 111 may normalize the input sentence to remove a special character "?".

The morpheme analyzer 112a may divide the normalized input sentence into morphemes and output "ANJEON, BELTEU, GA, PPAJI, JI, ANH, NEUNDE, EOTTEOHGE, HA, AYA, HA, JI".

When the part-of-speech analyzer 112b analyzes parts of speech of the morphemes and tags the analyzed parts of speech on the morphemes, "ANJEON/NNG, BELTEU/ NNG, GA/JKS, PPAJI/VV, JI/EC, ANH/VX, NEUNDE/EC, EOTTEOHGE/MAG, HA/VV, AYA/EC, HA/VX, JI/EF" may be output.

If the syllable analyzer 112c 112 divides the normalized input sentence into morphemes, "AN, JEON, BEL, TEU, GA, PPA, JI, JI, ANH, NEUN, DE, EO, TTEOH, GE, HAE, YA, HA, JI" may be output.

The input sentence may be divided into morphemes and divided into syllables and thus both word embedding and character embedding may be performed as described below.

As described above, the format conversion module 113 may perform indexing on an input sentence on the basis of a result of extracting a feature. For example, the format conversion module 113 may assign indexes to a plurality of words or features constituting the input sentence using a predefined dictionary. The indexes assigned during a format conversion process may indicate the positions of the words in the dictionary.

Using the format conversion module 113, a normalized input sentence "ANJEONBELTEUGA PPAJIJI ANHNEUNDE EOTTEOHGE HAEYA HAJI" may be indexed in units of morphemes or syllables as shown in FIG. 7. The indexes assigned to the input sentence by the format conversion module 113 may be used in an embedding process described below.

In examples described below, a preprocessed input sentence will be referred to as an input sequence. The input sequence may be processed in units of tokens, and tokens consisting of morphemes are used in examples described herein.

Figure 8:
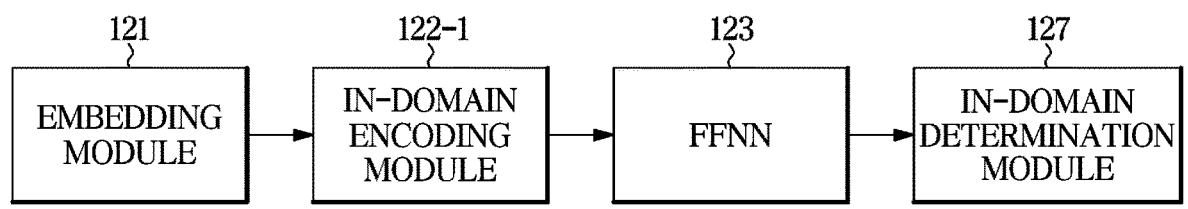
FIG. 8 is a control block diagram illustrating an answer determination module of a question and answer system.
Figure 9:
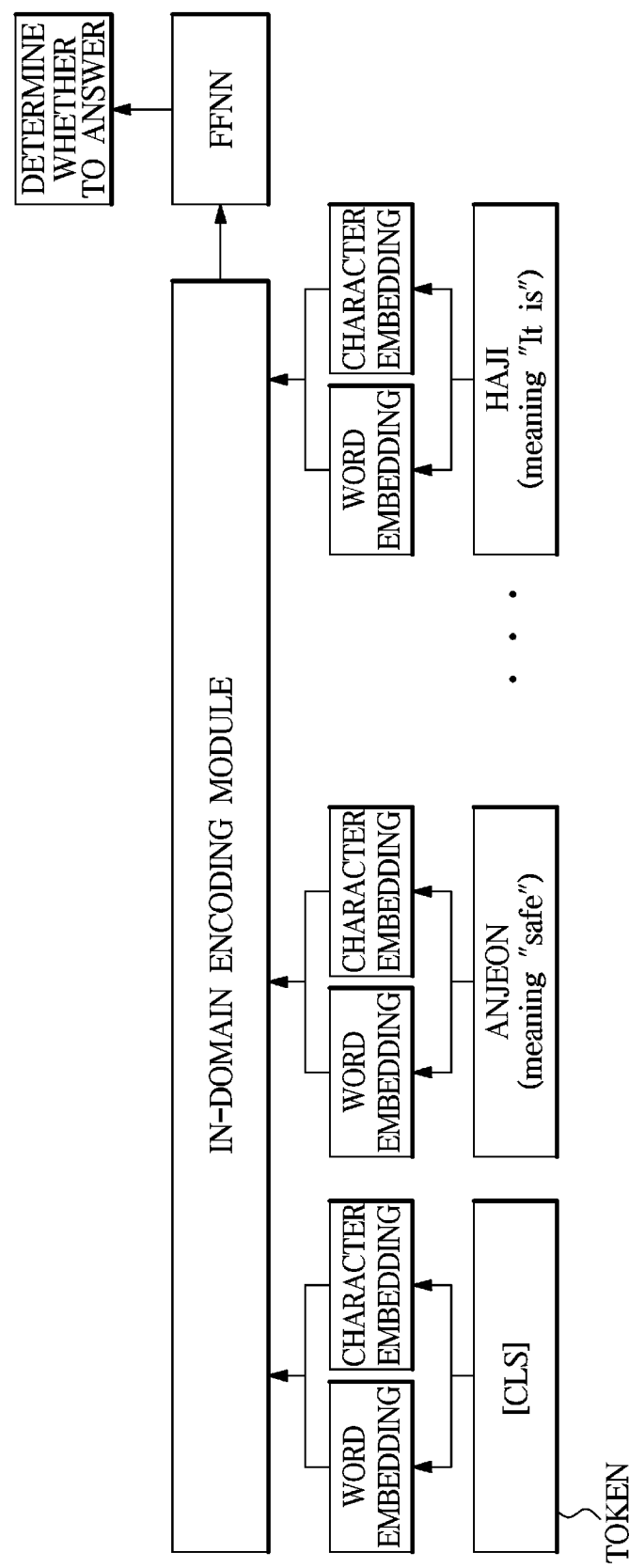
FIG. 9 is a diagram illustrating an operation of an answer determination module of a question and answer system in units of layers.

FIG. 8 is a control block diagram of an answer determination module of a question and answer system, and FIG. 9 is a diagram illustrating an operation of an answer determination module of a question and answer system in units of layers.

Data referred to herein may be a question, a domain and/or information about a category corresponding to the question in terms of the question and an answer.

In this case, the domain and the information about the category are each obtained by categorizing information contained in the question, and first, the domain may identify a situation of the question (e.g., a context of the question). For example, the domain identifies whether the question is related to a vehicle, a law, or common sense in sales. The category may be divided into levels 1 and 2 to categorize the meaning of the question. Level 1 may categorize the meaning of the question into a guide, vehicle information, a dashboard, emergency measures, or the like, and level 2 may sub-categorize the meaning of the question into economic driving, dashboard menu settings, an alarm system, security matters, or the like.

A category of level 1 will be referred to as a first category, and a category of level 2 will be referred to as a second category.

Accordingly, in a hierarchical relationship between the domain and the categories, the domain may be the most comprehensive, the first category (level 1) may be the second most comprehensive, and the second category (level 2) may be more specific. In the present disclosure, a model proposed for analysis of a question reflects characteristics described above, in which a domain is determined by a first layer (e.g., a first bidirectional gated recurrent unit (BiGRU) layer), a category level 1 may be determined by a second layer (e.g., a second BiGRU layer) based on information about the domain. Encoding may be performed based on previously accumulated information, and a result of a category level 2 may be output.

In the present disclosure, multi-task learning may be performed for tasks of a domain and first and second categories, whereas in a general method, a model may be provided for each task to obtain results of the three tasks. For example, a model 1 for obtaining a result of the domain, a model 2 for obtaining a result of the first category, and a model 3 for obtaining a result of the second category may be provided.

In this case, if a pipeline is created by identifying the structure and semantic information of data, a process may be defined by first implementing the model 1 to obtain a result of the domain, obtaining a result of the first category (level 1) using the result of the domain as a feature of the model 2, and obtaining a result of the second category (level 2) using the result of the domain and the result of the first category (level 1) as features of the model 3. In this case, a learning process may be individually performed for each of the models, and a time and cost necessary to obtain all the results of the domain, the first category, and the second category may increase. In addition, in the pipeline, error propagation, such as propagation of a previous error to a subsequent mode, may occur.

In the present disclosure, multi-task learning may be implemented to learn and infer tasks of a domain and first and second categories using one model, thus reducing an implementation time, and information of the three tasks can be incorporated in the one model through learning, thereby further improving performance and fixing an error propagation problem.

Referring to FIG. 8, the answer determination module 115 may include an embedding module 121, an encoding module (e.g., an in-domain encoding module 122-1), a feed forward neural network (FFNN) 123, and an in-domain determination module 127.

The embedding module 121 may perform an embedding process to vectorize an input sequence. For example, the embedding module 121 may perform embedding by applying a one-hot vector encoding method.

Specifically, if there are k words in an utterance, a k-dimensional 0 vector may be generated and only an index of a corresponding word may be expressed as 1. To this end, redundant words may be deleted, all remaining words may be arranged and converted into one-hot vectors, and each sentence may be reconstructed using the one-hot vectors.

Converting each word to a one-hot vector may be converting each word into a corresponding index in a vocabulary, thereby performing word embedding.

Referring to FIG. 9, a [CLS] token may be added to an input sequence input to the answer determination module 115. A meaning of an input sentence may be implied in a vector for a CLS token through an encoding process described below. The CLS token is a classification token and may have a meaning of classifying all sequences.

The embedding module 121 may perform not only word embedding but also character embedding. As described above, the feature extraction module 112 may extract not only features in units of morphemes but also features in units of syllables and thus the features extracted in units of syllables are also input to the embedding module 121 to be used for character embedding.

Pre-training may be applied for word embedding and character embedding. For example, for Korean, word embedding may be pre-trained by a neural network language model mechanism (NNLM) and character embedding may be pre-trained by GloVe (Pennington et al., 2014). For English, word embedding and character embedding may be pre-trained by FastText (Bojanowski et al., 2017). When such pre-trained embedding is used, the speed and performance of a deep learning model may be improved.

The embedding module 121 may output a word embedding vector $e_i^w = emb_w(q_i)$ generated by performing word embedding on the input sequence and a character embedding vector $e_i^c = CNN_c(qi)$ generated by performing character embedding on the input sequence, and the two types of embedding vectors may be concatenated and input to the in-domain encoding module 122-1.

The in-domain encoding module 122-1 may encode tokens of the input sequence represented by vectors by performing embedding on the input sequence. In the question and answer system 1, an input sequence may be classified but a new output sentence may not be generated and thus decoding may be omitted.

A last hidden state $r_n$ of the in-domain encoding module 122-1 may be input to an FFNN 123, and the output of the FFNN 123 may be input to an in-domain determination module 127.

In the question and answer system 1, the output of the FFNN 123 may be passed through a variational inference network before being input to the in-domain determination module 127 to improve the performance of determining whether to answer.

The variational inference network may learn a latent variable z, an average μ, and a variance σ together by a reparameterization method, and a loss function of a model may be expressed by Equation 1 below. In Equation 1 below, $q_\phi(z|x)$ denotes an encoder that compresses an input vector x to a latent variable and includes an FFNN. $p_\theta(y|z)$ denotes a decoder that obtains an output result y from the latent variable z. p(z) denotes a Gaussian distribution that is a prior probability distribution, and a normal distribution having an average of 0 and a variance of 1 is used therefor. KL in the left term of Equation 1 denotes Kullback-Leibler divergence that limits the latent variable z from the vector x for the input sentence according to the Gaussian distribution. The right term of Equation 1 denotes cross entropy for generating a sentence classification output result y from the sampled latent variable z.

[Equation 1]

$$\mathcal{L} = -KL(q_\phi(z|x)\|p(z)) + \mathbb{E}_{q_\phi(z|x)}[\log p_\theta(y|z)] \qquad (1)$$

The variational inference network may reinforce a deep learning model by extracting meaningful features by converting a semantic space included in a high-dimensional world into a low-dimensional space through learning on an assumption that there is a latent variable z in the semantic space as in manifold learning.

Given data is modeled to infer a posterior. In this case, a goal of modeling is to infer a true posterior but the true posterior cannot be identified. Because the true posterior cannot be identified, a modeling method using an approximated distribution is devised on an assumption that an already verified distribution (e.g., the Gaussian distribution) is close to the true posterior, and this method is a variational inference. In general, the variational inference may be applied to an auto-encoder but may be applied to a layer that outputs the first category in the present disclosure.

Because the first category is a more comprehensive category and the second category is a specific category, the number of labels of the second category may be greater than the number of labels of the first category. Therefore, it may be difficult to apply the variable interference, and thus in the present disclosure, the variable interference may be applied to a layer that outputs the first category with a relatively small number of labels.

The in-domain determination module 127 may determine whether an input sentence cannot be processed by the question and answer system 1. That is, whether the input sentence is out-of-domain (OOD) may be detected.

It may be determined that an input sentence corresponding to a user's utterance is a sentence that cannot be processed by the question and answer system 1 when the input sentence is a request for a service that is not supported by the question and answer system 1 or is meaningless. In the present disclosure, an input sentence (e.g., associated with a context of a vehicle) may be determined to be OOD, for example, if the input sentence is not related to a vehicle-related question.

if a semantic representation corresponding to an input sentence is input, the in-domain determination module 127 may calculate a parameter indicating a probability that the input sentence will be output and determine whether the input sentence is a sentence that cannot be processed by the question and answer system 1 (e.g., whether the input sentence is an OOD sentence) based on the calculated parameter. For example, an average of probabilities that words constituting the input sentence will be output may be calculated as a parameter indicating a probability that the input sentence will be output.

If the average of the probabilities that the words constituting the input sentence will be output is greater than or equal to a predetermined reference value, the in-domain determination module 127 may determine that the input sentence is an in-domain sentence, e.g., a sentence processable by the question and answer system 1. In contrast, if the average of the probabilities that the words constituting the input sentence will be output is less than the predetermined reference value, it may be determined that the input sentence is an OOD sentence, e.g., a sentence that cannot be processed by the question and answer system 1.

If it is determined that the input sentence is an in-domain sentence, the input sentence may be input to the learning module 120 to classify a domain and categories for the input sentence.

In contrast, if it is determined that the input sentence is an OOD sentence, for example, a notification that the input sentence is a sentence that cannot be processed by the question and answer system 1 and thus cannot be processed may be provided to a user.

Accordingly, an error rate of the question and answer system 1 may decrease, and when a user asks a question that is not related to a domain related to vehicle-related questions, the user may receive a notification in advance that the question cannot be processed and thus will be able to handle this matter.

A process of classifying a domain corresponding to an input sentence and a first category and a second category to which the input sentence belongs by the learning module 120 when the input sentence is determined to be an in-domain sentence will be described in detail below.

Figure 10:
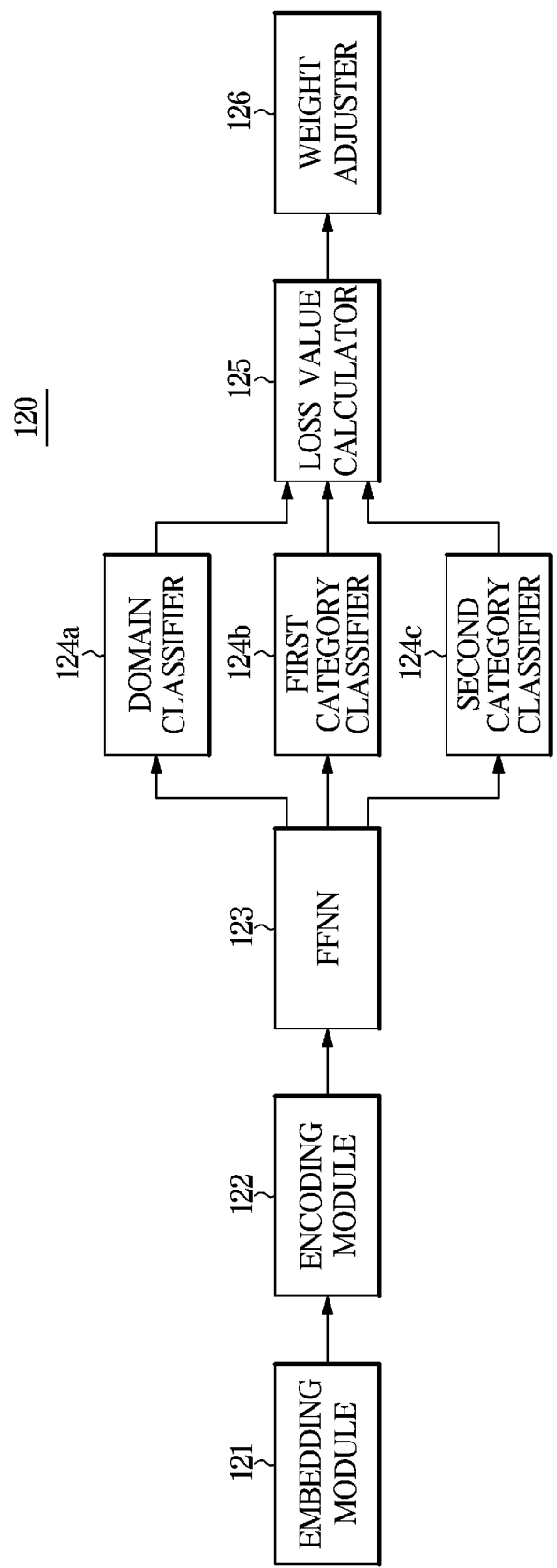
FIG. 10 is a control block diagram of a learning module of a question and answer system.
Figure 11:
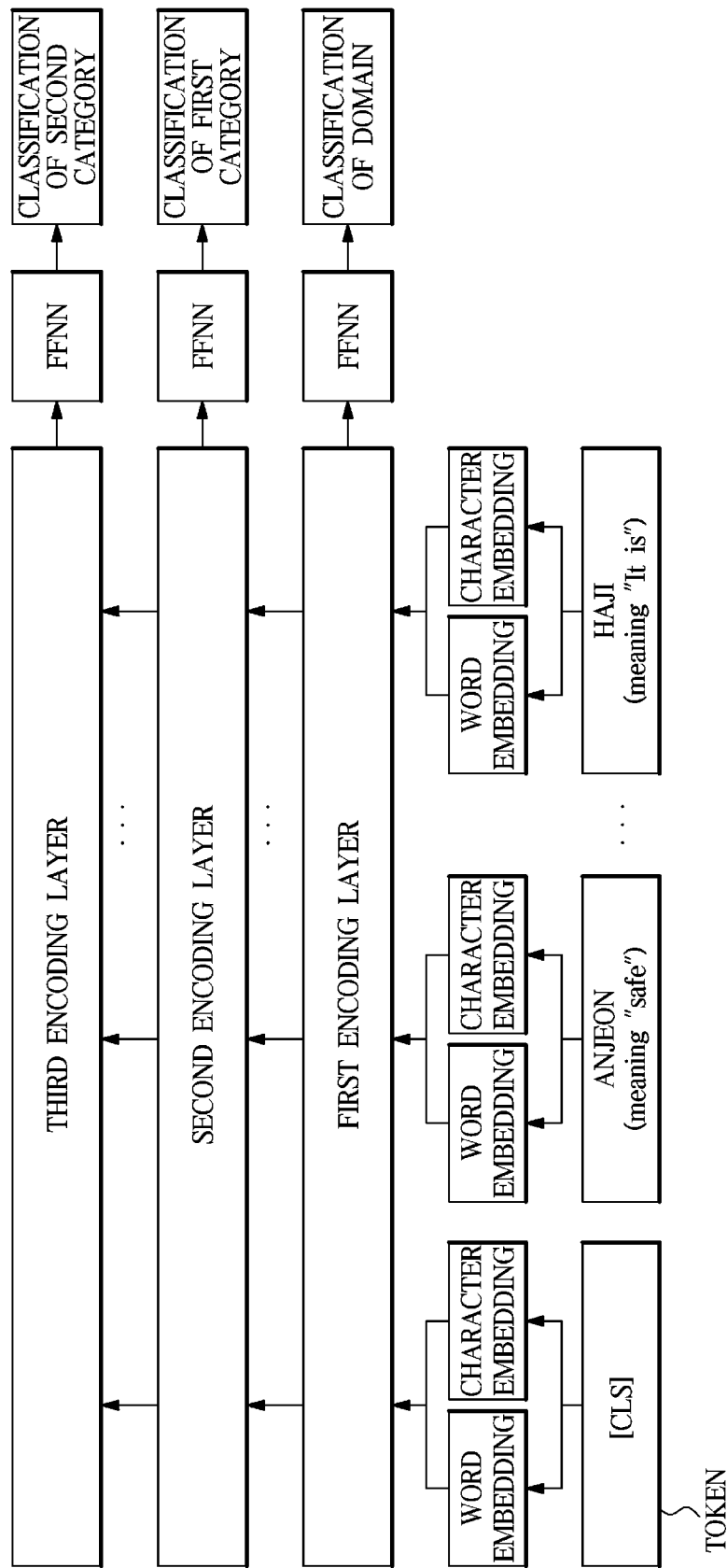
FIG. 11 is a diagram illustrating an operation of a learning module of the question and answer system of FIG. 10 in units of layers.

FIG. 10 is a control block diagram of a learning module of a question and answer system, and FIG. 11 is a diagram illustrating an operation of the learning module of the question and answer system of FIG. 10 in units of layers.

A learning module 120 may include a multi-task deep learning model that simultaneously learns a representative question and a category corresponding to an input sentence. Referring to FIG. 10, a learning module 120 may include an embedding module 121, an encoding module 122, an FFNN 123, a domain classifier 124a, a first category classifier 124b, a second category classifier 124c, a loss value calculator 125, and a weight adjuster 126.

The embedding module 121 may perform embedding to vectorize an input sequence. For example, the embedding module 121 may perform embedding by applying the one-hot vector encoding method.

For example, if there are k words, a k-dimensional 0 vector may be generated and only an index of a corresponding word may be expressed as 1. To this end, redundant words may be deleted, all remaining words may be arranged and converted into one-hot vectors, and each sentence may be reconstructed using the one-hot vectors.

Referring to FIG. 11, a [CLS] token may be added to an input sequence input to the learning module 120. A meaning of an input sentence may be implied in a vector for a CLS token through an encoding process described below.

The embedding module 121 may perform not only word embedding but also character embedding. As described above, the feature extraction module 112 may extract not only features in units of morphemes but also features in units of syllables and thus the features extracted in units of syllables may also be input to the embedding module 121 to be used for character embedding.

Syllable-unit information may provide information about a similarity between words and may be applicable to infrequent words or unknown words that are not included in a word dictionary, and thus the performance of deep learning may be improved using both word-unit information and syllable-unit information.

A pre-training may be applied for word embedding and character embedding. For example, for Korean, word embedding may be pre-trained by a neural network language model mechanism (NNLM) and character embedding may be pre-trained by GloVe (Pennington et al., 2014). For English, word embedding and character embedding may be pre-trained by FastText (Bojanowski et al., 2017). But aspects are not limited as such. When such pre-trained embedding is used, the speed and performance of a deep learning model may be improved.

The embedding module 121 may output a word embedding vector $e_i^w = emb_w(q_i)$ generated by performing word embedding on the input sequence and a character embedding vector $e_i^c = CNN_c(qi)$ generated by performing character embedding on the input sequence, and the two types of embedding vectors may be concatenated and input to the encoding module 122.

The encoding module 122 may encode tokens of the input sequence represented by vectors by performing embedding on the input sequence. In the question and answer system 1, an input sequence may be classified but a new output sentence may not be generated and thus decoding may be omitted.

The encoding module 122 may include a first encoding layer, a second encoding layer for encoding an output of the first encoding layer, and a third encoding layer for encoding an output of the second encoding layer. Each of the first encoding layer, the second encoding layer, and the third encoding layer may include a plurality of hidden layers.

The first encoding layer, the second encoding layer, and the third encoding layer may use an algorithm such as a recurrent neural network (RNN) or bidirectional gated recurrent units (BiGRUs) for sequential encoding. But aspects are not limited as such.

Each hidden state $s_i$ of the first encoding layer may be input to the second encoding layer, and a hidden state $s_{[CLS]}$ of a [CLS] token of the first encoding layer may be input to the FFNN 123. The hidden state $s_{[CLS]}$ of the [CLS] token may imply a meaning of the entire input sentence.

Each hidden state $s_i$ of the second encoding layer may be input to the third encoding layer and a last hidden state $r_n$ of the second encoding layer may be input to the FFNN 123.

A last hidden state $r_n$ of the third encoding layer may also be input to the FFNN 123. For example, the hidden state $s_{[CLS]}$ of the [CLS] token of the first encoding layer, the last hidden state $r_n$ of the second encoding layer, and the last hidden state $r_n$ of the third encoding layer may be input to the FFNN 123.

As described above, the learning module 120 may simultaneously learn classification of a domain and classification of a first category and a second category. To this end, the FFNN 123 may perform a linear operation using a common parameter for domain classification and category classification.

An output of the FFNN 123 may be input to the domain classifier 124a, the first category classifier 124b, and the second category classifier 124c.

For example, an output of the first encoding layer may be input to the domain classifier 124a via the FFNN 123, an output of the second encoding layer may be input to the first category classifier 124b via the FFNN 123, and an output of the third encoding layer may be input to the second category classifier 124c via the FFNN 123.

The domain classifier 124a may determine a domain corresponding to an input sentence among a plurality of predefined domains. A plurality of domains may be predefined, and the domain classifier 124a may use a linear function through the FFNN 123.

The domain classifier 124a may classify a domain corresponding to an input sentence by comparing a sentence vector of a representative question with an encoded input sequence.

The first category classifier 124b may determine a first category to which the input sentence belongs among a plurality of predefined categories.

The first category may be a topic corresponding to a major classification of the domain corresponding to the input sentence.

For example, vehicle-related FAQs may be classified into major categories, e.g., a basic guidelines and information category, a safety precautions category, a safety system category, a dashboard category, a convenient features category, a starting and driving your vehicle category, an emergency situations category, a maintenance category, a trouble-shooting category, a check trouble category, a 'how to maintain' category, a 'my car info' category, etc. according to the subjects of questions.

The first category classifier 124b may identify a category to which an input sentence belongs among major categories such as the above-described examples, and thus may match the input sequence to the identified category.

In the question and answer system 1, an output of the FFNN 123 may be passed through a variational inference network before being input to the first category classifier 124b to improve category classification performance.

The variational inference network may reinforce a deep learning model by extracting meaningful features by converting a semantic space included in a high-dimensional space into a low-dimensional space through learning on an assumption that there is a latent variable z in the semantic space as in manifold learning.

The second category classifier 124c may determine a second category to which the input sentence belongs among the plurality of predefined categories.

The second category may be a topic corresponding to middle classification of the domain corresponding to the input sentence.

For example, if an input sentence is "Can I use strong soap to wash a car?", a domain corresponding to the input sentence may be classified as "vehicle," a first category may be classified as "regular inspection," and a second category may be classified as "washing a car."

The second category classifier 124c may identify a category to which the input sentence belongs among middle categories included in the major categories and thus may match the input sequence to the identified category.

If the domain classifier 124a, the first category classifier 124b, and the second category classifier 124c output the domain and the categories corresponding to the input sentence, the loss value calculator 125 may calculate a loss value for the classification of the domain and loss values for the classification of the two categories. The loss value calculator 125 may calculate a total loss value by summing up the three loss values.

In this case, when $L_q$ denotes the loss value for the classification of the domain, $L_c$ denotes the loss value for the classification of the first category, and $L_e$ denotes the loss value for the classification of the second category, a total loss value L may be expressed by Equation 2 below.

$$L = \alpha L_q + \beta L_c + \gamma L_e \quad \text{[Equation 2]}$$

Here, hyper-parameters $\alpha$, $\beta$ and $\gamma$ may denote weights optimized for the classification of the domain, the classification of the first category, and the classification of the second category, respectively.

The weight adjuster 126 may adjust weights of hidden layers of a deep learning model to minimize the calculated total loss value.

The operations of the question and answer system 1 described above may be implemented by a computer program, and the question and answer system 1 may include at least one memory storing such a program and at least one processor for execution of the stored program. The above-described components such as the voice recognizer 150, the preprocessing module 110, the answer determination module 115, the learning module 120, and the output module 130 are distinguished from one another by operations thereof rather than physical structures thereof. Therefore, the components are not necessarily implemented by a memory or processor, and at least some of the components may share the memory or processor.

The question and answer system 1 according to an embodiment may be implemented in a vehicle or a server connected to the vehicle through communication. A case in which the question and answer system 1 is implemented in a server will be described as an example below.

Figure 12:
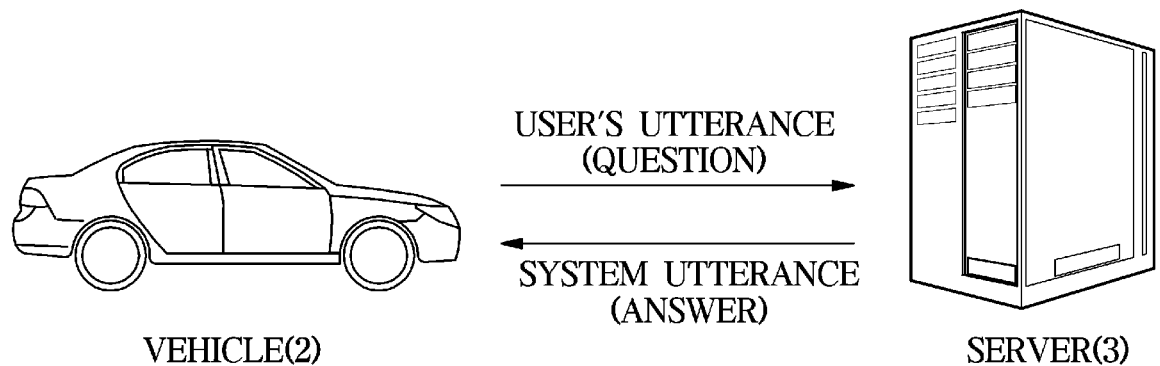
FIG. 12 is a diagram illustrating information exchanged between a vehicle and a server.
Figure 13:
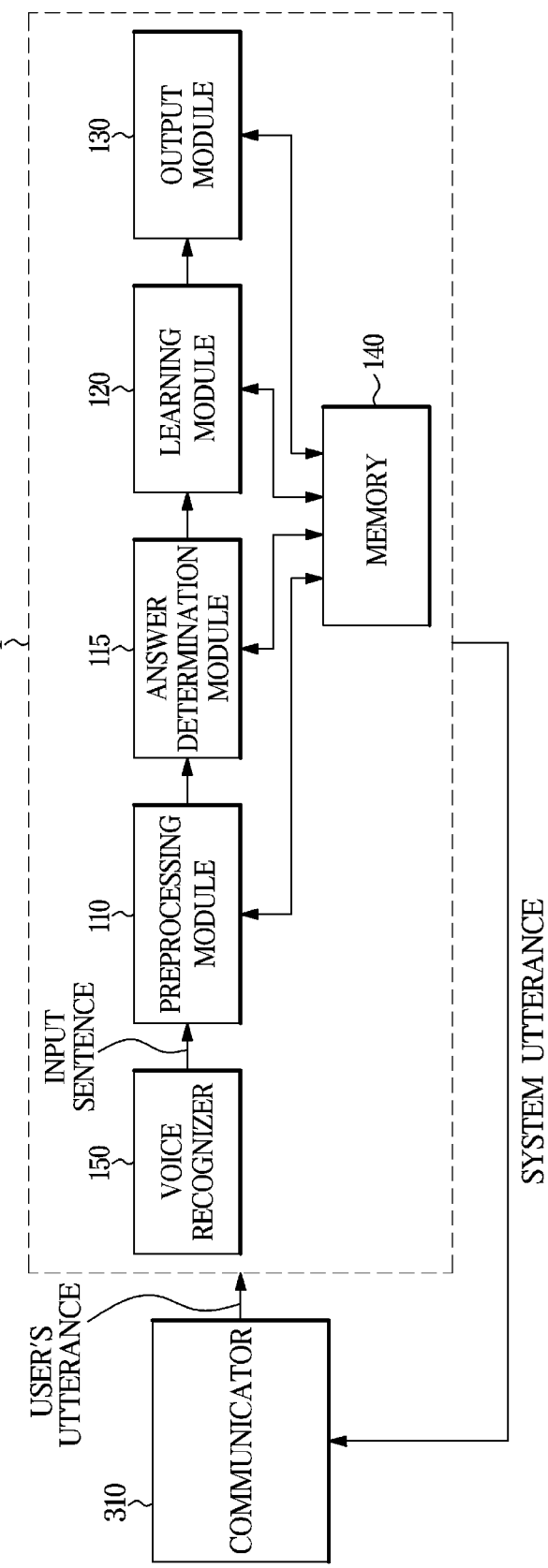
FIG. 13 is a control block diagram of a server including a question and answer system.
Figure 14:
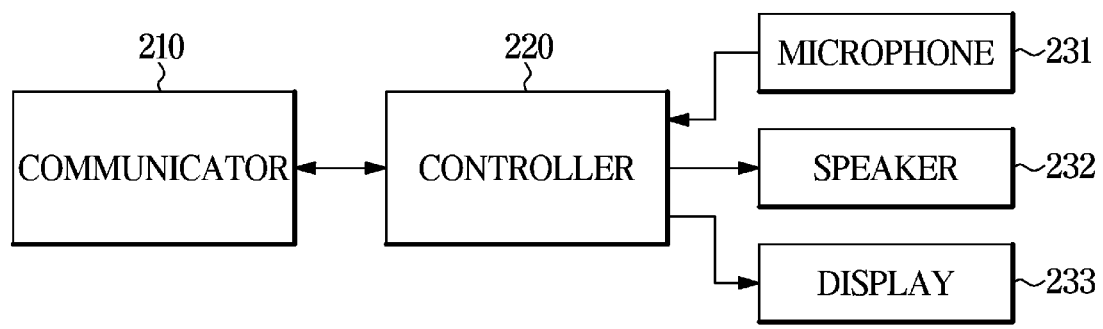
FIG. 14 is a control block diagram of a vehicle connected to a server including a question and answer system.

FIG. 12 is a diagram illustrating information exchanged between a vehicle and a server. FIG. 13 is a control block diagram of a server including a question and answer system. FIG. 14 is a control block diagram of a vehicle connected to a server including a question and answer system.

Referring to FIG. 12, if a user of a vehicle 2 inputs an utterance, the user's input utterance may be transmitted to a server 3. The user's utterance may include a vehicle-related question, and the server 3 including the question and answer system 1 described above may transmit a system utterance including an answer to the vehicle-related question to the vehicle 2.

Referring to FIG. 13, the server 3 may include a communicator 310 that transmits a signal to and receives a signal from the vehicle 2 through communication, and the question and answer system 1. The communicator 310 may employ at least one of various wireless communication methods such as 4G, 5G, and Wi-Fi to communicate with the vehicle 2.

The communicator 310 may receive a user's utterance transmitted in the form of a voice signal from the vehicle 2, and the voice recognizer 150 of the question and answer system 1 may convert the user's utterance into text (an input sentence) by the above-described method and input the text to the preprocessing module 110.

If the learning module 120 that completes learning is actually used, loss value calculation and weight adjustment may be omitted among the operations of the question and answer system 1. Except for loss value calculation and weight adjustment, an input sentence may be preprocessed, embedding and encoding may be performed, and a domain and categories corresponding to the input sentence may be classified similar to the operations of the question and answer system 1.

If the learning module 120 outputs a domain and categories corresponding to the input sentence, the output module 130 may search the memory 140 for an answer to a question and transmit the answer to the vehicle 2 through the communicator 310.

The output module 130 may transmit the answer in the form of text or a voice signal. If the answer is transmitted in the form of a voice signal, a text-to-speech (TTS) engine may be included in the output module 130.

Referring to FIG. 14, the vehicle 2 may include a communicator 210 configured to communicate with the server 3, a controller 220 configured to control the vehicle 2, and a microphone 231, a speaker 232, and a display 233 that correspond to a user interface.

A user's utterance input to the microphone 231 may be converted into a voice signal and the voice signal may be transmitted to the server 3 through the communicator 210. The communicator 310 of the vehicle 2 may employ at least one of various wireless communication methods such as 4G, 5G, and Wi-Fi to communicate with the vehicle 2.

If an answer corresponding to a question uttered by a user is transmitted from the server 3, the communicator 210 may receive the answer and the controller 220 may output the answer through the speaker 232 or the display 233 according to the type of the answer.

For example, the answer may be visually output through the display 233 if the answer transmitted from the server 3 is text, and may be output audibly through the speaker 232 if the answer transmitted from the server 3 corresponds to a voice signal.

Alternatively or additionally, even when the answer transmitted from the server 3 is text, the TTS engine included in the vehicle 2 may convert the transmitted answer into a voice signal and output the answer converted into the voice signal through the speaker 232.

A control method of a question and answer system will be described below. The question and answer system 1 described above may be used to perform the control method of a question and answer system. Therefore, the above description of FIGS. 1 to 14 may also apply to the control method of a question and answer system unless otherwise stated.

Figure 15:
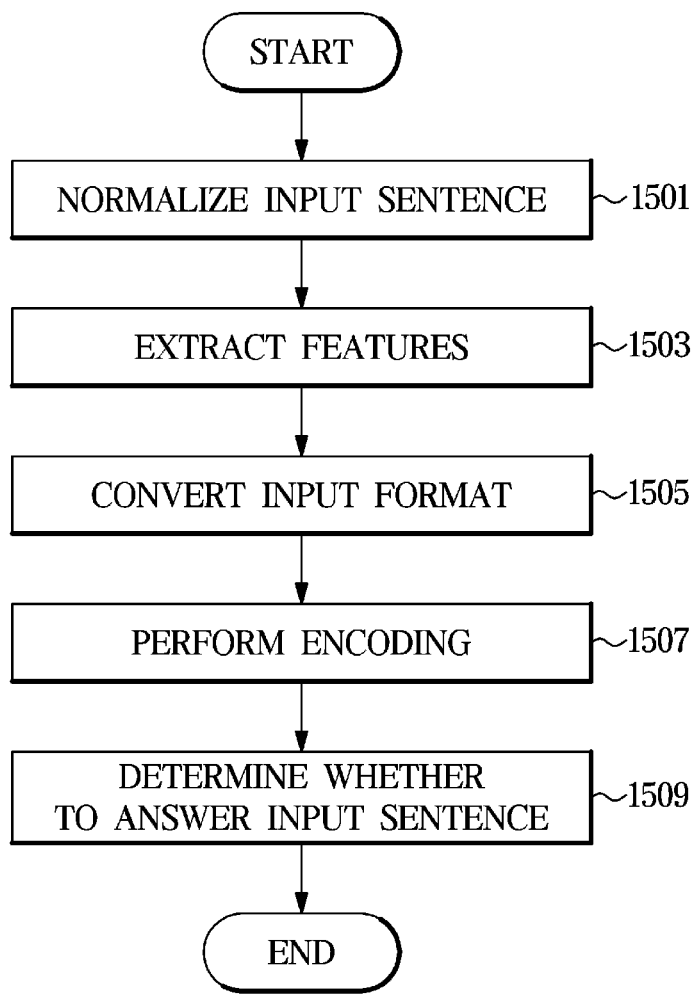
FIG. 15 is a flowchart of a control method of a question and answer system.

FIG. 15 is a flowchart of a control method of a question and answer system. The control method shown in the flowchart is a method to be performed during determination of whether to answer by the question and answer system described herein.

To perform the control method of a question and answer system, an input sentence may be input to the preprocessing module 110. An input sentence input to the preprocessing module 110 in a learning operation may be an extended sentence such as the example of FIG. 3.

Referring to FIG. 15, the preprocessing module 110 may normalize an input sentence (1501). In the normalization of the input sentence, less important data (e.g., meaningless data), such as special characters and symbols, may be excluded from the input sentence. All input sentences in operations described below are normalized input sentences.

The preprocessing module 110 may extract features from the input sentence (1503). The features extracted from the input sentence may include morphemes, parts of speech, syllables, etc. For example, the preprocessing module 110 may divide the input sentence into morphemes, and the part-of-speech analyzer 112b may analyze parts of speech of the morphemes and tag the parts of speech on the morphemes. If the input sentence is divided into syllables and the syllables are used as features, unknown or infrequent words may be analyzed to improve the performance of the learning module 120.

The preprocessing module 110 may convert an input format of the input sentence on the basis of the extracted features (1505). The conversion of the input format may include performing indexing on the input sentence. The preprocessing module 110 may assign indexes to a plurality of words or features constituting the input sentence using a predefined dictionary. The indexes assigned during the conversion of the input format may indicate the positions of the words in the dictionary.

The input sentence preprocessed by the above-described process will be referred to as an input sequence.

The input sequence may be vectorized by performing embedding on the input sequence based on a result of performing indexing. In this case, both word embedding and character embedding may be performed. A word embedding vector generated by performing word embedding on the input sequence and a character embedding vector generated by performing character embedding on the input sequence may be concatenated and input to the in-domain encoding module 122-1 to encode these vectors (1507). A method of encoding the vectors is as described above with respect to the question and answer system 1.

A result of encoding the vectors may be input to the in-domain determination module 127. As described above, the in-domain determination module 127 may determine whether to answer the input sentence (1509). For example, if a semantic representation corresponding to the input sentence is input, the in-domain determination module 127 may calculate a parameter indicating a probability that the input sentence will be output and determine whether the input sentence is a sentence that cannot be processed by the question and answer system 1 (e.g., whether the input sentence is an OOD sentence) based on the calculated parameter.

If it is determined that the input sentence is an in-domain sentence, the input sentence may be input to the learning module 120 to classify a domain and categories for the input sentence.

Figure 16:
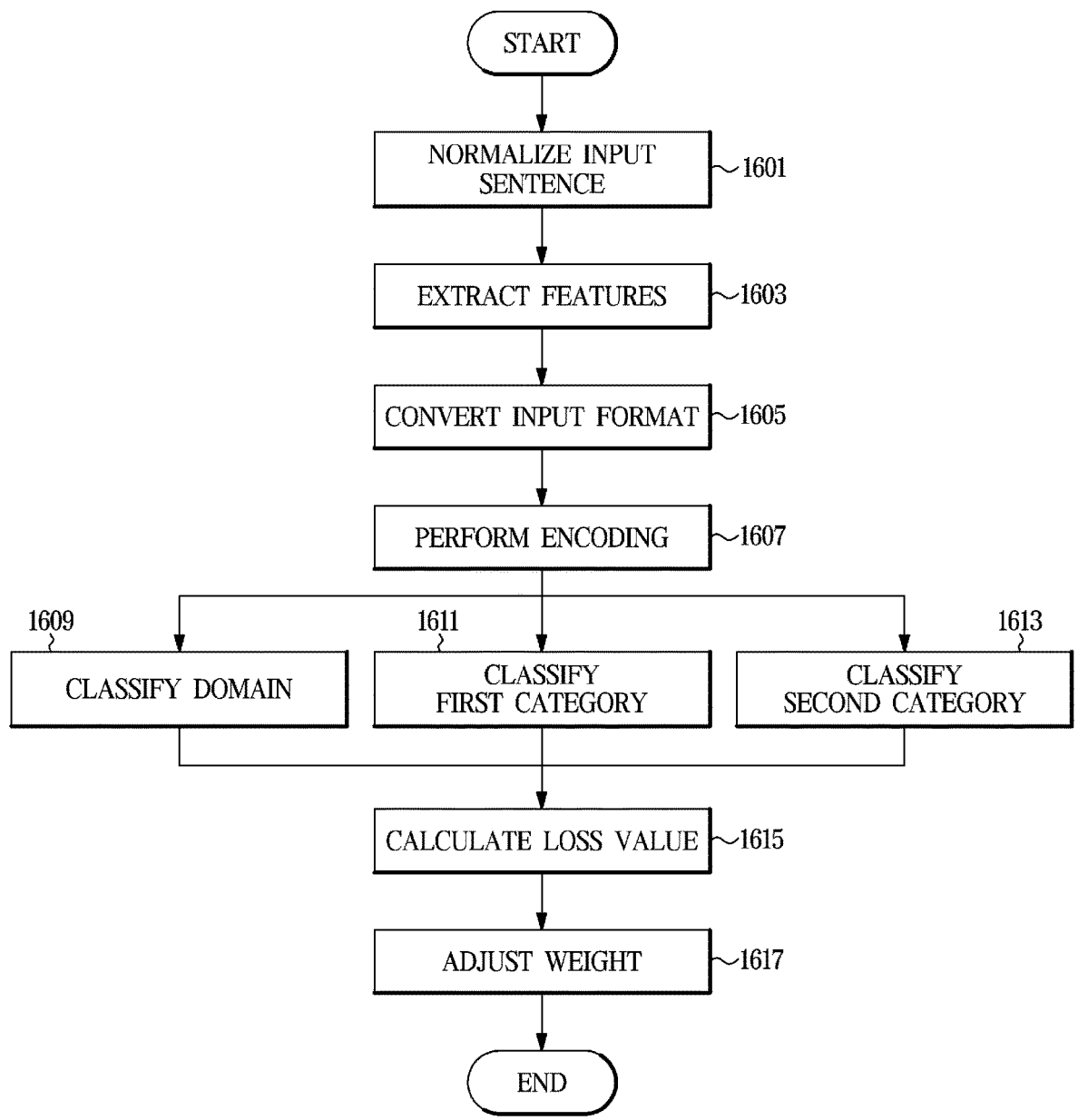
FIG. 16 is a flowchart of a control method of a question and answer system.

FIG. 16 is a flowchart of a control method of a question and answer system. The control method shown in the flowchart is a method performed during learning of the question and answer system.

A process of preprocessing an input sentence is as described above with reference to FIG. 15 and thus will be omitted here.

An input sentence preprocessed by the process will be referred to as an input sequence.

The input sequence may be vectorized by performing embedding on the input sequence based on a result of performing indexing. In this case, both word embedding and character embedding may be performed. A word embedding vector generated by performing word embedding on the input sequence and a character embedding vector generated by performing character embedding on the input sequence may be concatenated and input to the encoding module 122 to encode these vectors (1607).

The encoding module 122 may include a first encoding layer, a second encoding layer for encoding an output of the first encoding layer, and a third encoding layer for encoding an output of the second encoding layer. Each of the first encoding layer, the second encoding layer, and the third encoding layer may include a plurality of hidden layers.

The first encoding layer, the second encoding layer, and the third encoding layer may use an algorithm such as a recurrent neural network (RNN) or bidirectional gated recurrent units (BiGRUs) for sequential encoding.

A result of encoding the vectors is input to the domain classifier 124a, the first category classifier 124b, and the second category classifier 124c. As described above, the result of encoding the vectors may be passed through the FFNN 123 and thereafter be input to these classifiers 124a, 124b, and 124c.

The domain classifier 124a may classify a domain corresponding to the input sentence (1609), the first category classifier 124b may classify a major category to which the input sentence belongs (1611), and the second category classifier 124c may classify a middle category to which the input sentence belongs (1613). For example, the first category classifier 124b may determine a category to which the input sentence belongs among a plurality of predefined major categories. To improve major category classification performance, encoded input sequences may be input to a variable inference network before classification of major categories.

If the domain, the first category, and the second category corresponding to the input sentence are determined, the loss value calculator 125 may calculate a loss value for the classification of the domain, a loss value for the classification of the first category, and a loss value for the classification of the second category, and calculate a total loss value by adding the three loss values together (1615).

The weight adjuster 126 may adjust weights of hidden layers of a deep learning model to minimize the calculated total loss value.

In accordance with an aspect of the present disclosure, a question and answer system includes an answer determination module configured to analyze an input sentence to determine whether to answer the input sentence, a learning module configured to output a domain corresponding to the input sentence and a plurality of categories to which the input sentence belongs when it is determined to answer the input sentence, and an output module configured to output an answer to the input sentence, wherein the learning module performs multi-task learning using the input sentence as input data and using as output data the domain corresponding to the input sentence and the plurality of categories to which the input sentence belongs.

The answer determination module may include an in-domain encoding module configured to encode text converted from the input sentence, and an in-domain determination module configured to determine whether to answer the input sentence on the basis of an output of the encoding module.

The answer determination module may further include a variational inference network configured to apply a variational inference to the output of the encoding module, and an output of the variational inference network may be input to the in-domain determination module.

The learning module may classify the domain corresponding to the input data and a first category and a second category to which the input data belongs during the multi-task learning.

The learning module may calculate a loss value of the classification of the domain and loss values of the classification of the first and second categories, and adjust a weight of a deep learning model used for the multi-tasking learning on the basis of the calculated loss values.

The learning module may include an encoding module configured to encode an input sequence corresponding to the input data, a domain classifier configured to classify the domain on the basis of an output of the encoding module, a first category classifier configured to classify the first category on the basis of the output of the encoding module, and a second category classifier configured to classify the second category on the basis of the output of the encoding module.

The encoding module may include a first encoding layer, a second encoding layer configured to encode an output of the first encoding layer, and a third encoding layer configured to encode an output of the second encoding layer.

The domain classifier may classify the domain corresponding to the input data on the basis of the output of the first encoding layer.

The learning module may further include a variational inference network configured to apply a variational inference to the output of the second encoding module, and an output of the variational inference network may be input to the first category classifier.

The second category classifier may classify the second category to which the input data belongs on the basis of an output of the third encoding layer.

The domain and the plurality of categories may include a domain and categories related to a vehicle.

In accordance with another aspect of the present disclosure, a control method of a question and answer system includes analyzing an input sentence to determine whether to answer the input sentence, when it is determined to answer the input sentence, performing multi-task learning using the input sentence as input data and using as output data a domain corresponding to the input sentence and a plurality of categories to which the input sentence belongs, when the multi-task learning is completed, determining a domain corresponding to the input sentence and a plurality of categories to which the input sentence belongs on the basis of a result of performing the multi-task learning, and outputting an answer to the input sentence.

The determining of whether to answer the input sentence may include encoding text converted from the input sentence, and determining whether to answer the input sentence on the basis of a result of encoding the text.

The determining of whether to answer the input sentence may further include applying a variational inference to the result of encoding the text, and determining whether to answer the input sentence on the basis of a result of applying the variational inference.

The performing of the multi-task learning may include classifying the domain corresponding to the input sentence and the first and second categories to which the input sentence belongs.

The performing of the multi-task learning may further include calculating a loss value of the classification of the domain and loss values of the classification of the first and second categories, and adjusting a weight of a deep learning model used in the multi-tasking learning on the basis of the calculated loss values.

The performing of the multi-task learning may include encoding an input sequence corresponding to the input data, classifying the domain on the basis of a result of encoding the input sentence, classifying the first category on the basis of the result of encoding the input sequence, and classifying the second category on the basis of the result of encoding the input sequence.

The encoding of the input sequence may include performing first encoding, performing second encoding on a result of performing the first encoding, and performing third encoding on a result of performing the second encoding.

The classifying of the domain may include classifying the domain corresponding to the input sentence on the basis of the result of performing the first encoding.

The classifying of the first category may include applying a variational inference to the result of performing the second encoding, and classifying the first category to which the input sentence belongs on the basis of a result of applying the variational inference.

The classifying of the second category may include classifying the second category to which the input sentence belongs on the basis of the result of performing the third encoding.

The domain and the plurality of categories may include a domain and categories related to a vehicle.

As is apparent from the above description, according to a question and answer system and a control method thereof, the performance of a deep learning model can be improved by learning both domain classification and category classification, which are related to each other, with respect to an input sentence.

Whether an input sentence is a sentence that can be answered by the question and answer system can be determined by performing in-domain validation, thereby reducing an error rate of the question and answer system and handling an answer that is not related to a domain in advance.

In addition, the performance of the question and answer system can be improved by classifying a domain of an input sentence and classifying the domain into a major category and a minor category, and using the domain and the major category and the minor category as useful features in asking a question and an answering the question.

The features set forth herein have been described above with reference to the accompanying drawings. It will be understood by those of ordinary skill in the technical field to which the present disclosure pertains that the present disclosure may be implemented in a different form than those of the embodiment(s) set forth herein without departing from the technical idea or essential features of the present disclosure. Various features set forth herein are only examples and should not be interpreted in a restrictive manner.

What is claimed is:

1. A system comprising:
one or more processors; and
memory storing instructions that, when executed by the one or more processors, cause the system to:
analyze an input sentence to determine whether to provide an answer associated with the input sentence;
using a multi-task learning process and based on a determination to provide an answer associated with the input sentence, determine a domain corresponding to the input sentence and determine a plurality of categories to which the input sentence belongs, wherein the multi-task learning process is configured to use the input sentence as input data and to use, as output data, the domain and the plurality of categories; and
output, based on the domain and the plurality of categories, a determined answer associated with the input sentence,
wherein the instructions that, when executed by the one or more processors, cause the system to:
encode, using an encoder, an input sequence corresponding to the input data to generate an output of the encoder;
classify, using a domain classifier and based on the output of the encoder, the domain;
classify, using a first category classifier and based on the output of the encoder, a first category of the plurality of categories; and
classify, using a second category classifier and based on the output of the encoder, a second category of the plurality of categories.

2. The system according to claim 1, wherein the instructions that, when executed by the one or more processors, cause the system to:
encode, using an in-domain encoding module, text converted from the input sentence to generate an output of the in-domain encoding module; and
determine, using an in-domain determination module and based on the output of the in-domain encoding module, whether to provide an answer associated with the input sentence.

3. The system according to claim 2, wherein the instructions that, when executed by the one or more processors, cause the system to apply, based on a variational inference network, a variational inference to the output of the in-domain encoding module,
wherein an output of the variational inference network is input to the in-domain determination module.

4. The system according to claim 1, wherein the instructions that, when executed by the one or more processors, cause the system to classify, by a learning module and during the multi-task learning process, the domain, a first category of the plurality of categories, and a second category of the plurality of categories.

5. The system according to claim 1, wherein the instructions that, when executed by the one or more processors, cause the system to:
calculate a first loss value of a classification of the domain and second loss values of classifications of the plurality of categories; and
adjust, based on the first loss value and the second loss values, a weight of a deep learning model used for the multi-task learning process.

6. The system according to claim 1, wherein the encoder comprises:
a first encoding layer configured to encode a received input associated with the input sequence;
a second encoding layer configured to encode an output of the first encoding layer; and
a third encoding layer configured to encode an output of the second encoding layer.

7. The system according to claim 6, wherein the instructions that, when executed by the one or more processors, cause the system to classify, using the domain classifier and based on the output of the first encoding layer, the domain.

8. The system according to claim 6, wherein the instructions that, when executed by the one or more processors, cause the system to apply, using a variational inference network, a variational inference to the output of the second encoding layer,
wherein an output of the variational inference network is input to the first category classifier.

9. The system according to claim 6, wherein the instructions that, when executed by the one or more processors, cause the system to classify, using the second category classifier and based on an output of the third encoding layer, the second category.

10. The system according to claim 1, wherein the system is equipped in a vehicle or a server communicating with the vehicle, and wherein the domain comprises a domain associated with the vehicle, and the plurality of categories comprise categories associated with the vehicle.

11. A control method comprising:
analyzing, by a computing device, an input sentence to determine whether to provide an answer associated with the input sentence;
based on a determination to provide an answer associated with the input sentence, performing a multi-task learning process to determine a domain corresponding to the input sentence and to determine a plurality of categories to which the input sentence belongs, wherein the performing of the multi-task learning process comprises using the input sentence as input data and using, as output data, the domain and the plurality of categories;
determining, based on the multi-task learning process, the domain and the plurality of categories; and
outputting, based on the domain and the plurality of categories, a determined answer associated with the input sentence,
wherein the performing of the multi-task learning process further comprises:
encoding, using an encoder, an input sequence corresponding to the input data to generate an output of the encoder;
classifying, using a domain classifier and based on a result of encoding the input sequence, the domain;
classifying, using a first category classifier and based on the result of encoding the input sequence, a first category of the plurality of categories; and
classifying, using a second category classifier and based on the result of encoding the input sequence, a second category of the plurality of categories.

12. The control method according to claim 11, further comprising:
encoding text converted from the input sentence; and
determining, based on a result of encoding the text, whether to provide an answer associated with the input sentence.

13. The control method according to claim 12, wherein the determining of whether to provide an answer associated with the input sentence comprises:
applying a variational inference to the result of encoding the text; and
determining, based on a result of applying the variational inference, whether to provide an answer associated with the input sentence.

14. The control method according to claim 11, wherein the performing of the multi-task learning process comprises classifying the domain, a first category of the plurality of categories, and a second category of the plurality of categories.

15. The control method according to claim 11, wherein the performing of the multi-task learning process further comprises:
calculating a first loss value of a classification of the domain and second loss values of classifications of the plurality of categories; and
adjusting, based on the first loss value and the second loss values, a weight of a deep learning model used for the multi-task learning process.

16. The control method according to claim 11, wherein the encoding of the input sequence comprises:
performing, based on the input sequence, a first encoding;
performing, based on a result of the first encoding, a second encoding; and
performing, based on a result of the second encoding, a third encoding.

17. The control method according to claim 16, wherein the classifying of the domain comprises:
classifying, based on the result of the first encoding, the domain.

18. The control method according to claim 16, wherein the classifying of the first category comprises:
applying a variational inference to the result of the second encoding; and
classifying, based on a result of applying the variational inference, the first category.

19. The control method according to claim 16, wherein the classifying of the second category comprises:
classifying, based on the result of the third encoding, the second category.

20. An apparatus comprising:
one or more processors; and
memory storing instructions that, when executed by the one or more processors, cause the apparatus to:
identify an input sentence;
using a multi-task learning process, determine a domain corresponding to the input sentence and determine a plurality of categories to which the input sentence belongs, wherein the multi-task learning process is configured to use the input sentence as input data and to use, as output data, the domain and the plurality of categories, and wherein the domain and the plurality of categories are determined by:
encoding, using an encoder, an input sequence corresponding to the input data to generate an output of the encoder;
classifying, using a domain classifier and based on the output of the encoder, the domain;
classifying, using a first category classifier and based on the output of the encoder, a first category of the plurality of categories; and
classifying, using a second category classifier and based on the output of the encoder, a second category of the plurality of categories; and
output, based on the domain and the plurality of categories, a determined answer associated with the input sentence.

21. The apparatus according to claim 20, wherein the apparatus is equipped in a vehicle, and
wherein the domain comprises a domain associated with the vehicle, and the plurality of categories comprise categories associated with the vehicle.

* * * * *